United States Patent [19]

Sakata

[11] Patent Number: 4,561,825

[45] Date of Patent: Dec. 31, 1985

[54] APPARATUS FOR FETCHING COMPONENT PARTS

[75] Inventor: Tomoaki Sakata, Yokohama, Japan

[73] Assignee: Hitachi, Ltd., Tokyo, Japan

[21] Appl. No.: 478,664

[22] Filed: Mar. 25, 1983

[30] Foreign Application Priority Data

Mar. 26, 1982 [JP] Japan .................................. 57-47164

[51] Int. Cl.⁴ ............................................... B25J 3/00
[52] U.S. Cl. .................... 414/753; 414/730; 901/35
[58] Field of Search ............... 414/753, 749, 735, 730; 901/46, 35, 50, 45; 294/86 R

[56] References Cited

U.S. PATENT DOCUMENTS 3,709,379  1/1973  Kaufeldt .......................... 901/35 X
3,984,006  10/1976  Takeyasu et al. ............... 414/730 X

FOREIGN PATENT DOCUMENTS 0076135  4/1983  European Pat. Off. ........ 414/730 X 0766854  10/1980  U.S.S.R. ........................... 901/35 X

*Primary Examiner*—Joseph E. Valenza
*Assistant Examiner*—Donald W. Underwood
*Attorney, Agent, or Firm*—Antonelli, Terry & Wands

[57] ABSTRACT

An apparatus for fetching a component part, with the apparatus including a finger unit pivotally supporting a plurality of fingers adapted to catch a component part. A first detection unit detects a catch of a component part and a first drive opens or closes the fingers. A holding unit swingably supports the finger unit and has a slider which is slidable in a horizontal direction by a drawback force. A second detection unit detects the slider at an end of the sliding motion. A moving unit supports the holding unit and moves the holding unit at least in the vertical direction by a second drive. A drive control is provided for controlling the first and second drives in accordance with signals produced by the first and second detection units so as to enable a catching of the component part.

3 Claims, 15 Drawing Figures

APPARATUS FOR FETCHING COMPONENT PARTS

The present invention relates to an apparatus for fetching automatically one or more component parts which are placed at random positions and in random attitude.

Conventionally, vibratory parts feeders have been used widely for fetching component parts placed in bulk at random to the specified location. However, vibratory parts feeders have problems such as large dependence on the shape of parts handled by the feeders, improperness of use for large dimensional parts and damageable parts, and unavoidable noise.

In order to solve these problems, methods using artificial vision are under study. In such methods, component parts placed in bulk are recognized as images by use of a television camera or the like, the images are analyzed by a processor such as a computer so as to determine the component part to be fetched (a component located at the upper portion of the bulk), and then the fetching apparatus is controlled based upon the result of the analysis. This system, however, needs a very expensive image sensor and processor, and therefore, at present, it is not practical.

Accordingly, it is an object of the present invention to provide a parts fetching apparatus which avoids the problems encountered in the conventional vibratory parts feeders, and is inexpensive in construction.

In accordance with the present invention an apparatus is provided which comprises a finger unit with a sensor means for sensing a catch of a component part, a holding unit which supports the finger unit and turns the finger unit when the finger of the unit comes in contact with a part, with the holding unit having a sensor means for sensing the turning operation. A moving unit supports the holding unit and moves it (along with the finger unit) at least on a vertical plane with respect to component parts, and a drive controller controls the movement of the moving unit and finger unit based on the signals from the sensors so as to search for a work piece which can be fetched and catch the part piece.

The present invention will be apparent from the following detailed description taken in conjunction with the accompanying drawings, in which.

Figure 5A:
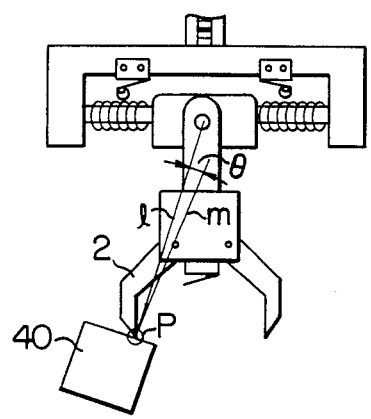
Figure 5B:
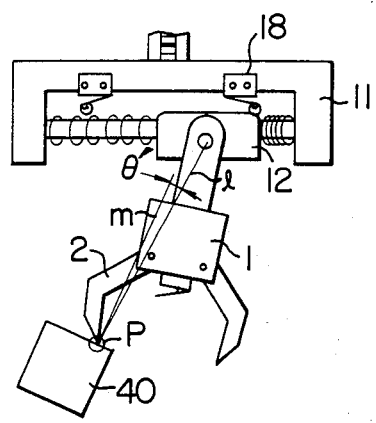
Figure 5C:
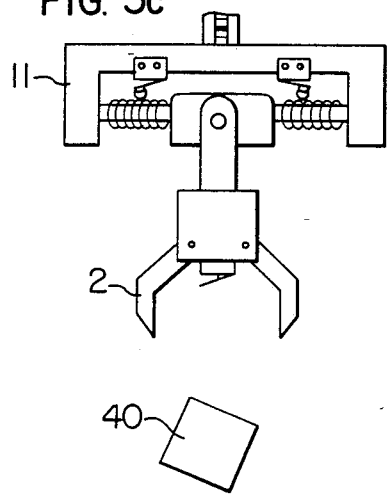
Figure 5D:
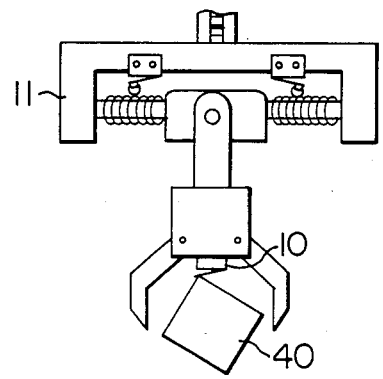
Figure 6A:
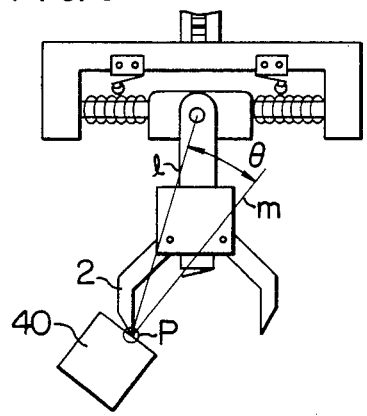
Figure 6B:
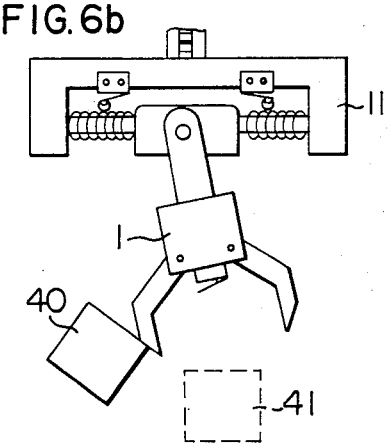
Figure 7:
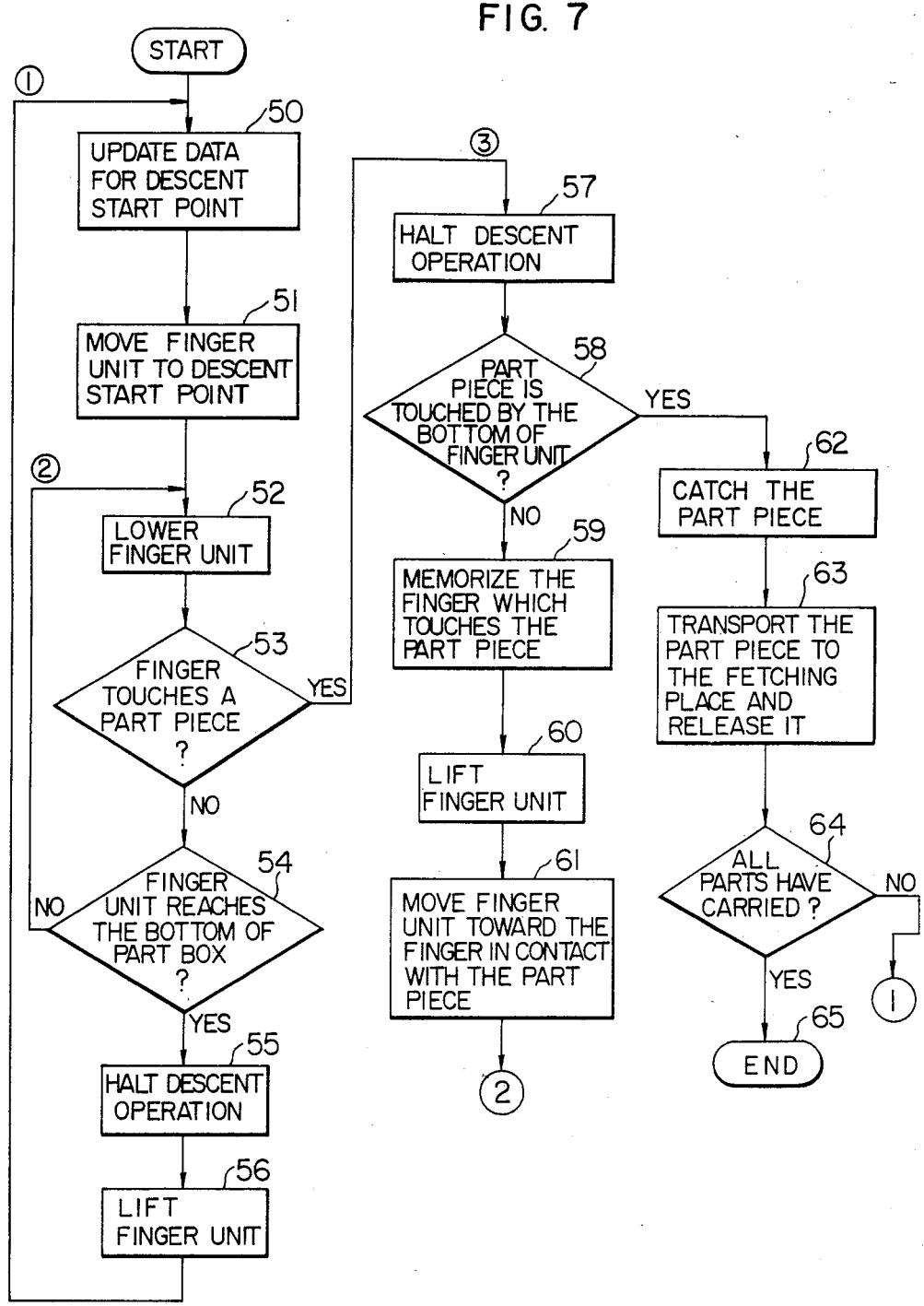

FIGS. 3a, 3b, 4a, 4b, 4c, 4b, 5a, 5b, 5c, 5d, 6a, and 6b are illustrations explaining typical operations of the apparatus; and FIG. 7 is a flowchart showing the control operation for the apparatus.

One embodiment of the present invention will now be described with reference to the drawings.

Figure 1:
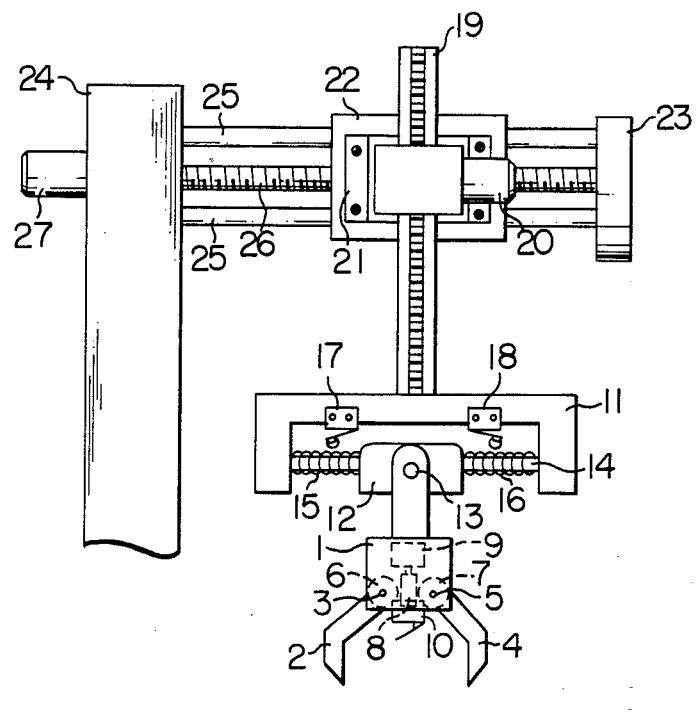
FIG. 1 is an illustration showing one embodiment of a fetching apparatus constructed in accordance with the present invention.

Referring now to the drawings wherein like reference numerals are used throughout the various views to designate like parts and, more particularly, to FIG. 1, according to this Figure, fingers 2 and 4 are pivoted by pins 3 and 5, respectively, on finger unit 1. The finger 2 has a worm gear 6 fixed thereon through the pin 3, and the finger 4 has a worm gear 7 fixed thereon through the pin 4. The worm gears 6 and 7 are in engagement with a worm 8 fixed on the drive shaft of motor 9 which is mounted on the finger unit 1. A microswitch 10 is provided at the bottom of the finger unit 1.

The finger unit 1 is pivotally mounted on slider 12 through a pin 13. The slider 12 is mounted on slide rail 14 which is fixed on holding unit 11 so that it travels along the rail 14, and the slider 12 is connected to the holding unit 11 through extension springs 15 and 16. Microswitches 17 and 18 are provided on the holding unit 11.

The holding unit 11 is fixed on rack unit 19 which is driven in the vertical direction by motor 20 with a rotation detector. The rack unit 19 is mounted on slide base 22 through a bracket 21, and the slide base 22 is mounted movably on slide rail 25. The slide rail 25 has one end fixed to pole 24 and another end fixed to guide end 23. The slide base 22 is internally threaded so that it is moved in the horizontal direction by feed screw 26 which is driven by motor 27 with a rotation detector.

Figure 2:
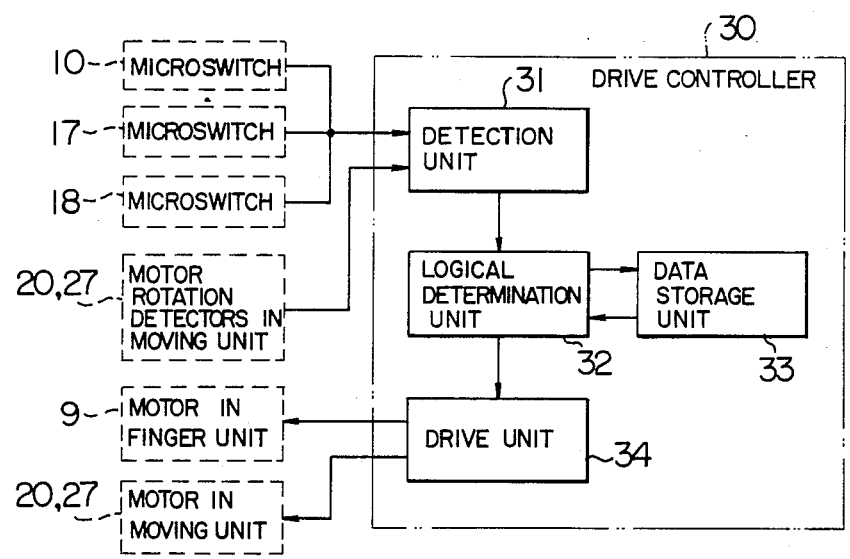
FIG. 2 is a block diagram showing one embodiment of the associated controller.

As shown in FIG. 2, a drive controller 30 includes a detection unit 31, a logical determination unit 32, a data storage unit 33, and a drive unit 34.

Wiring is made for the controller 30 so that the signal from the microswitch 10 in the finger unit 1, the signals from the microswitches 17 and 18 in the holding unit 11, and signals from the motor rotation detectors 20 and 27 in the moving unit are entered to the logical determination unit 32 through the detection unit 31. Wiring is made so that the output signals from the logical determination unit 32 are sent to the drive unit 34 to thereby drive the motor 9 for the fingers and the motors in the moving unit. Further, wiring is made so that data is transferred between the data storage unit 33 and the logical determination unit 32.

Figure 3A:
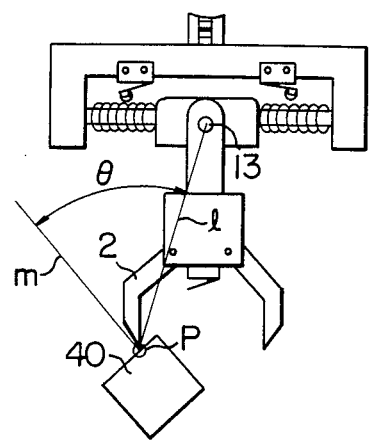
Figure 3B:
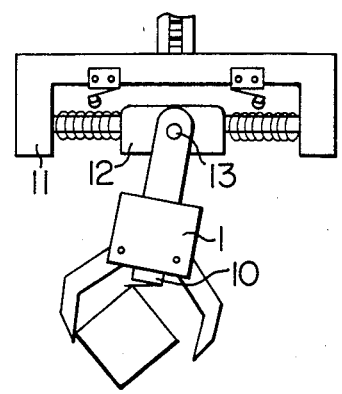

In FIG. 3a, the finger 2 is in contact with a part piece 40 at point P. Normal m at the point P on the part surface and line l connecting the point P and the center of the pin 13 are assumed to make an angle of $\theta$. Further assumption is made in FIG. 3a that $\theta$ is larger than $\theta\mu$, where $\theta\mu$ denotes the friction angle between the finger tip and the part piece, and it is expressed by the friction factor $\mu$ as $\theta\mu = \tan^{-1}\mu$. In this case, the tip of the finger 2 slides on the surface of the part piece 40, and if the holding unit 11 is further lowered, the finger unit 1 swings around the pin 13 to enclose the part piece 40, and then the microswitch 10 provided at the bottom of the finger unit 1 comes into contact with the part piece 40 as shown in FIG. 3b. Catching of the part piece is recognized by the signal produced by the microswitch 10.

Figure 4A:
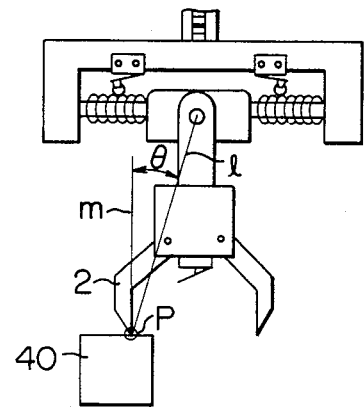
Figure 4B:
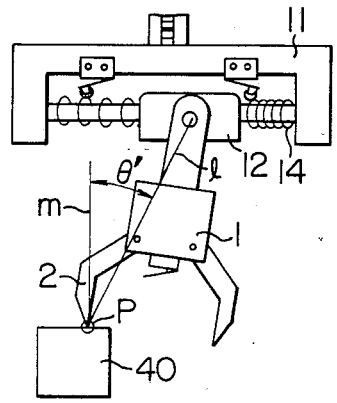
Figure 4C:
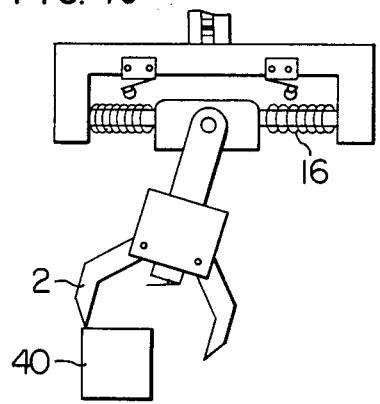
Figure 4D:
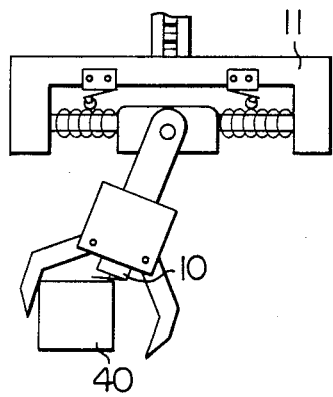

FIG. 4a shows the case where the initial contact angle $\theta$ is smaller than $\theta\mu$. In this case, the tip of the finger 2 does not slide on the top surface of the part piece 40, and if the holding unit 11 is further lowered, the finger unit 1 swings around the point P and at the same time the slider 12 moves rightward, causing the angle between the normal m and the line l to become $\theta'$ as shown in FIG. 4b. The friction factor between the slider 12 and the slide rail 14 is considered to be far smaller than that between the finger 2 and part piece 40, and it is neglected. When $\theta'$ becomes larger than the friction angle $\theta\mu$, the finger 2 is no longer held by the friction force at point P, and it slides on the top surface of the part piece 40 by being pushed back by the extension spring 16 as shown in FIG. 4c. If the holding unit 11 is further lowered, the microswitch 10 comes in contact with the part piece 40 as shown in FIG. 4d.

FIG. 5a also shows the case where the initial contact angle $\theta$ is smaller than $\theta\mu$. The finger unit 1 swings around the point P and the slider 12 moves rightward, producing a contact angle of $\theta'$ as in the case of FIG. 5b. However, the slider 12 operates the microswitch 18 before $\theta'$ becomes larger than $\theta\mu$. Then, the falling operation for the holding unit 11 is stopped, and the moving unit is controlled so that the holding unit 11 is once lifted and moved toward the finger 2 (i.e., toward the part piece 40) by a certain distance as shown in FIG. 5c. After that, the holding unit 11 is lowered until the microswitch 10 comes into contact with the part piece 40.

FIG. 6a shows the case where the initial contact angle $\theta$ is larger than $\theta\mu$, and in this case the top surface of the part piece 40 has the opposite inclination as compared with the case of FIG. 3a. In this case, the finger unit 1 swings away from the part piece 40 as the holding unit 11 is lowered. If the holding unit 11 is further lowered, the finger unit 1 is directed to adjacent part piece 41.

The following describes the control operation of the drive controller 30 with reference to the flowchart shown in FIG. 7.

Above part pieces, there are a plurality of preset points at which the holding unit 11 starts to descend, and the decent point is updated by operational step 50 in the flowchart. In step 51, the holding unit 11 (i.e., the finger unit 1) is moved to the current descent point, and the unit is lowered in step 52.

During the descent operation, the states of the microswitches 10, 17 and 18 are monitored, and when the operation of a microswitch is detected, the control sequence at step 53 branches off through flow ③ to step 57 in which the descent operation is halted.

If the operation of a microswitch is not detected in step 53, the operations of flow ② are repeated cyclically until the arrival of the finger unit 1 at the bottom of the parts box is detected in step 54. When the finger unit 1 reaches the bottom of the parts box, the descent operation is halted in step 55 and the finger unit 1 is lifted in step 56. The control sequence returns to the start point ①, and the descent start point is updated in step 50. Then, the finger unit 1 is lowered again until the operation of a microswitch is detected in step 53.

After the control sequence has branched through the flow ③ to step 57 in response to the detection of the operation of a microswitch and the descent operation is stopped, it is checked whether the microswitch which has operated in step 50 is the microswitch 10 located at the bottom of the finger unit 1 or the microswitch 17 or 18 provided on the holding unit 11.

If it is determined that a part piece 40 is touched not by the bottom portion of the finger unit 1, but by the tip of a finger, it is memorized in step 59 which finger has touched the part piece 40. Then, the finger unit 1 is lifted in step 60, and the holding unit 11 is moved in step 61 in the direction corresponding to the finger which has touched the part piece 40. The control sequence returns to point ② and repeats the cyclic operations.

If a part piece is touched by the bottom portion of the finger unit 1, the control sequence in step 58 branches off to step 62 in which the part piece 40 is caught, and then it is transported and released at the fetching place in step 63. These operations (the branch cycle from step 64 to the start point ① are repeated, and when all part pieces are carried, the control sequence reaches the end point (step 65).

It is apparent from the foregoing structure and operation that the inventive apparatus does not employ an expensive vision device and its processor, but works to detect the presence of part pieces 40 and their spatial relationship by using simple contact sensors (e.g., microswitches), resulting in a lower manufacturing cost and yet higher operational realiability. This facilitates the maintenance activity and provides superior durability.

As described above, the present invention realizes an inexpensive and reliable parts fetching apparatus by the provision comprising a finger unit 1 with a plurality of fingers and having means for detecting a catch of a part piece 40, a holding unit which supports the finger unit 1 and turns the finger unit 1 by the drawback force when a finger of the unit comes in contact with a part piece and has means for detecting the turning operation, a moving unit which supports the holding unit and moves it at least on a vertical plane, and a drive controller which controls the moving unit 1 and finger unit in accordance with the signals from the detection means so that a part piece 40 is caught.

What is claimed is:

1. An apparatus for fetching a component part, the apparatus comprising:
   finger means pivotally supporting a plurality of fingers adapted to catch a component part, and having a first detection means for detecting a catch of a component part and a first drive means for opening or closing said fingers;
   holding means swingably supporting said finger means, said holding means including a holder frame, guide means fixed on said holder frame, slider means slidably mounted on said guide means to slide in a horizontal direction from an original position along said guide means when a contact angle between said finger means and the component part is not greater than a predetermined angle, means for biasing said slider means so as to enable said slider means to be restored to the original position, and second detection means for detecting said slider means at the end of the sliding motion;
   moving means having a second drive means, said moving means supporting said holding means and moving said holding means in the horizontal and vertical directions by said second drive means; and
   drive control means for controlling said first drive means in response to a signal produced by said first detection means so as to catch said component part, said drive control means controlling said second drive means in response to a signal produced by said second detecting means so as to move said holding means as well as said finger means in the vertical and horizontal directions to thereby again attempt to catch said component part.

2. An apparatus for fetching a component part, the apparatus comprising:
   finger means pivotally supporting a plurality of fingers adapted to catch a component part, and having a first detection means for detecting a catch of the component part and a first drive means for opening or closing said fingers, said first detection means comprises a microswitch provided at a bottom of said finger means, so that a catch of said component part is detected when said microswitch comes into contact with said component part;
   holding means swingably supporting said finger means, said holding means including a holder frame, guide means fixed on the holder frame, slider means slidably monted on said guide means to slide in a horizontal direction from an original position along said guide means when a contact angle between said finger means and the component part is not greater than a predetermined angle, means for biasing said slider means so as to enable said slider means to be restored to the original position, and second detection means for detecting said slider means at the end of the sliding motion;

moving means supporting said holding means and moving said holding means at least in the vertical direction by a second drive means; and drive control means controlling said first and second drive means in accordance with signal produced by said and second detecton means so as to catch said component part.

3. An apparatus according to claim 1, wherein said means for biasing includes an extension spring for providing the restoring force to said slider means.

* * * * *